United States Patent [19]
Kress et al.

[11] Patent Number: 5,280,210
[45] Date of Patent: Jan. 18, 1994

[54] UNIVERSAL ELECTRIC MOTOR WITH A SWITCH RING MOUNTED ADJACENT THE BRUSHES

[75] Inventors: Willy Kress, Bisingen; Josef Seifert, Grosselfingen, both of Fed. Rep. of Germany

[73] Assignee: Kress-Elektric GmbH & Co. Elektromotorenfabrik, Bisingen, Fed. Rep. of Germany

[21] Appl. No.: 290,449

[22] Filed: Dec. 27, 1988

[30] Foreign Application Priority Data

Dec. 30, 1987 [DE] Fed. Rep. of Germany ....... 3744488

[51] Int. Cl.$^5$ .................. H02K 23/64; H02K 1/04; H02K 11/00; H02K 5/14
[52] U.S. Cl. ..................... 310/158; 310/43; 310/50; 310/68 A; 310/71; 310/239; 310/242
[58] Field of Search ............ 310/43, 50, 68 A, 68 R, 71, 89, 158, 229, 230, 240, 242, 248, 249, 258

[56] References Cited

U.S. PATENT DOCUMENTS

| | | | |
|---|---|---|---|
| 4,587,384 | 5/1986 | Yacobi | 310/68 A |
| 4,613,781 | 9/1986 | Sanders | 310/239 |
| 4,748,353 | 5/1988 | Klingenstein et al. | 310/71 |
| 4,777,395 | 10/1988 | Taylor et al. | 310/89 |
| 4,801,831 | 1/1989 | Lewis | 310/89 |
| 4,845,396 | 7/1989 | Huber | 310/68 R |
| 4,851,730 | 7/1989 | Fushiya et al. | 310/249 |
| 4,926,075 | 5/1990 | Fushiya et al. | 310/50 |

FOREIGN PATENT DOCUMENTS

| | | |
|---|---|---|
| 0235443 | 9/1987 | European Pat. Off. . |
| 1052156 | 4/1959 | Fed. Rep. of Germany . |
| 1854861 | 7/1962 | Fed. Rep. of Germany . |
| 3149106 | 6/1983 | Fed. Rep. of Germany ......... H02K 5/16 |
| 3529208 | 2/1986 | Fed. Rep. of Germany ......... H02K 5/14 |
| 0224053 | 10/1986 | Fed. Rep. of Germany ......... H02K 5/22 |
| 3538940 | 5/1987 | Fed. Rep. of Germany ......... H02K 11/00 |
| 1564031 | 3/1969 | France . |

Primary Examiner—Steven L. Stephan
Assistant Examiner—C. LaBalle
Attorney, Agent, or Firm—Darby & Darby

[57] ABSTRACT

An electric motor comprises bracket shaped end plates having extensions that lead directly to the stator and are connected to the stator by introducing the extensions into grooves. The motor includes a layered arrangement of components on the collector-side, comprising a carrier plate with a punched grid pattern forming the electric wiring. The grid pattern, together with the carrier plate, carry brush holders. Next in the axial direction is a switching ring bridging preselected line connections of the grid pattern by means of short circuiting bridges, and which is rotatably seated in a central recess of a mounting plate provided on the end plate. All connections can be fabricated by simple pressing and plugging and the motor is suited for fully automatic assembly operations.

18 Claims, 8 Drawing Sheets

UNIVERSAL ELECTRIC MOTOR WITH A SWITCH RING MOUNTED ADJACENT THE BRUSHES

BACKGROUND OF THE INVENTION

The present invention relates to an electric universal motor according to the preamble of claim 1. In the case of a known electric drive motor of this type (DE-OS 31 49 106) the stator, which is formed by a permanent magnet, is surrounded by an annular sheet-steel strip forming a magnetic short-circuit, the two sides of the strip being arranged axially adjacent and connected to bearing supports. The bearing supports have the form of brackets and accommodate each one shaft bearing for the rotor shaft. One of the shaft bearings is designed as a roller bearing which is held directly in a pot-shaped recess of the bearing support and projects outwardly therefrom by a predetermined amount. It is thereby possible to use this bearing element, i.e. in the particular case the outer ring of the roller bearing, which necessarily extends absolutely centrically to the bearing element, for receiving and centering another assembly arranged on the motor, such as a gear box. As regards the electric wiring possibilities, no details are provided; but complicated arrangements are certainly not required given the fact that the stator consists of a permanent magnet.

It has been further known (U.S. Pat. No. 4,613,781) in connection with an electric motor to equip one side of the motor with an end cap assembly comprising a plastic component with a plurality of strip-like metallic lines embedded in its interior for establishing electric connections between the motor components and brush holders. To this end, each electric line which is intended to make contact with a brush holder is wound about a base portion of the brush holder, each brush holder being equipped for this purpose with lateral flanges provided on its base.

In addition, the individual brush holders are designed in such a manner that the lateral wall is bent off in the form of a loop and lengthened so that it reaches below the respective carbon brush in the brush holder, in the manner of a hook, for the purpose of holding the brush at a certain distance relative to the collector ring of the armature during the assembly operation. Thereafter, i.e. after completion of the assembly operation, the hook is pressed outwardly whereby the carbon brush is released so that contact can be made between the brush and the collector of the electric motor.

It has been further known in connection with an assembly for an electric motor (DE-GM G 85 20 258.4) to provide a plate consisting of an insulating material and carrying a circuit arrangement with a central opening for the collector of an electric motor, and to design the frame parts, which are arranged on the plate opposite each other and intended for holding brushes that can be connected to the circuit arrangement, in such a manner that resiliently biassed extensions of the springs of spring-loaded mounting means arranged laterally beside the frame parts extend into the frame parts. The springs are wound upon the spring-loaded mounting means in the form of a coil. At least one portion of the electric circuit arrangement is embedded in the plastic carrier plate.

This method of embedding at least the essential components of the wiring required for the operation of an electric motor has been known also from DE-OS 36 04 675. In this case, an insulating component is used for embedding the essential parts of the conductor path and for supporting at the same time other components necessary for operating the motor, such as brush rockers, which are likewise integrated in the same component. The component is designed in the form of a plate with a central bore enabling the collector of the electric motor to be passed through the plate.

In the case of another electric motor of known design (European Patent Application No. 0 235 443), an annular carrier plate carries a plurality of electric components making contacts with electric lines embedded in the carrier plate due to the fact that the electric lines are partially released by the carrier plate for contact-making purposes. Brush holders, which are likewise mounted on the carrier plate, are provided with lateral extensions which are snapped over free conductor areas, in the manner of a snap-on connection, so that a safe form-locking connection is obtained between the lines inside the carrier plate and the housings of the brush holders. But the assembly input required for mounting a plurality of components on the carrier plate, including separate, wound biassing springs for the brushes and their carrier pins, is already very considerable; and in addition, parts of the electric lines which are embedded in the carrier plate extend from the latter in the axial direction in order to establish the contact to the another part, for example the stator.

It has further been known, in connection with an electric motor for a smaller electric tool, to design a cup-shaped bearing support in such a manner that it forms sort of a partial housing for the stator accommodated therein, with the rotor being arranged to rotate freely inside the stator. The rotor shaft is seated on the side of the cup-shaped bearing support, in a roller-bearing formed by the bearing support. In addition, the bearing support is equipped with switching-on and cut-off means, field plugs and a suppression capacitor. A contact grid arranged on the bearing support is designed in the form of a punched grid for the selective connection of reactance coils, change-over switches, diodes and resistors. The punched grid is connected to the side of circuit arrangement facing the rotor. In addition, a switching ring is provided the rotation of which enables different contacts to be made, for example for reversing the sense of rotation or reducing the speed (European Patent Application No. 0 224 054).

It has been further known in this connection (European Patent Application No. 0 224 053), to arrange the plane punched grid on one side of a carbon holder plate, with the carbon brushes being arranged on the other side of the carbon holder plate. The connection contacts for the field windings are obtained in this manner by connection reeds which are bent off at a right angle relative to the main plane of the punched grid. The punched grid takes the form as a continuous metal strip line and is welded, bonded or connected in any other manner to the surface on the rotor side of the carbon holder plate which as such consists of a plastic material.

It is a problem of the known electric motors and/or of their components that although some simplifications can be achieved by certain individual features, the resulting structures are still extremely complex as regards the number of individual components, the operation of fitting them together, and the assembly of the electric motor, and this in particular if one considers that such an electric motor should also be provided with means enabling it to be switched on and off, and, above all, enabling its sense of rotation to be reversed. However, it is exactly the reversal of the sense of rotation which is connected with considerable circuitry input so that considerable problems have to be overcome in this connection, but also as regards the support of the brushes and the establishment of contacts between the latter and other circuit components, and quite generally in connection with the whole basic structure and design of the electric motors, which problems stand in the way of a substantially automatic assembly and low-cost production of electric motors.

Now, it is the object of the present invention to provide an electric universal motor which requires only a small number of individual components, is capable of giving high continuous performance, meets all demands regarding the electric wiring possibilities, including the connection of switch-on, cut-off and change-over switches, and which is still designed in such a manner that it can be produced on automatic production lines, without any sacrifices regarding stability and, above all, the exact centering of the rotor relative to the stator surrounding it or the latter's pole shoes.

ADVANTAGES OF THE INVENTION

The invention achieves this object with the aid of the characterizing features of claim 1 and provides the advantage that the bearing brackets provided on both sides ensure highly precise and, above all, safe stabilization of the motor components relative to each other, i.e. in particular exact centering of the rotor relative to the stator, i.e. its pole shoes, with a uniform air gap all around the rotor. The bracket-shaped sheet-steel pieces arranged on both sides of the stator and forming at the same time the mounting supports for the armature shaft, serve simultaneously as short-cicuiting rings so that a motor of this type can be produced with moderate input. If the bearings should heat up, the heat is dissipated over a large surface, and the extremely high stability of the electric motor according to the invention makes the motor particularly robust and, accordingly, suited for universal use. In addition, an improvement of the motor power by up to 20% can be achieved, compared with conventional electric motors of substantially the same dimensions.

It is an additional particular aspect of the present invention that the assembly of the motor is substantially facilitated. By arranging the individual components in axial layers, production on automatic production lines has been rendered possible, the special method of mounting the bearing brackets on the two sides enabling the rotor to be centered safely due to the fact that extensions of the bearing brackets can be introduced flush into grooves which are arranged directly in the stator plate and which are closed on top, at least in part, so that the arrangement can do without any mechanical intermediate bearing parts and the bearing is centered directly relative to the stator with respect to which the rotor has to observe an air gap of uniform width.

The concept according to the invention further allows for particularly efficient contact-making between the carbon brushes and the electrically conductive connections in the motor, the necessary circuit arrangements for switching the motor on and off and for reversing its sense of rotation being also integrated in the motor.

The features specified by the sub-claims constitute advantageous developments and improvements of the electric universal motor defined by the main claim. Particular advantages are obtained in this connection when a grid pattern establishing all electric connections is applied on the surface of a carrier plate on the side of the rotor, with the brush holders being in direct contact, over large surfaces, with the metallic grid pattern and fixed to the latter and to the carrier plate via suitable extensions. The whole assembly is then held by a mounting plate which is in direct contact with the inside of the outer bearing bracket and which is provided with projections extending towards the rotor, engaging the mounting plate and supporting a switching ring which latter establishes contact connections on the circuit board by resilient spring brackets seated thereon.

BRIEF DESCRIPTION OF THE DRAWING

One embodiment of the invention will now be described in more detail with reference to the drawing in which:

FIG. 6 shows a diagrammatic top view of the grid pattern (punched grid) of the electric wiring within the universal motor, with brush holders mounted thereon and associated switching bow carriers for electric switching operations, while

FIGS. 10 and 11 show a top view and a side view, respectively, of the carrier board on the collector side fixing the electric wiring, while

DESCRIPTION OF THE EMBODIMENTS

It is the basic idea of the present invention to provide a high-power, compact, simple electric motor for use in any drive system, which consists of only a few components, the latter being arranged in axial layers so that the motor can be produced without any problems and with particular advantage on fully-automatic production lines. To this end, preference is deliberately given to a robust, simple structure providing for easy assembly, rather than to the possibility to exchange wearing parts, so that according to one preferred embodiment of the invention, the parts are assembled in a permanent manner by notching, beading, or the like. Based on the concept of the invention, it will, therefore, be much more cost-saving for the user to replace the whole unit than to repair it. The concept of the invention provides satisfactory solutions even to such problematic aspects as the formation of perfect and uniform air gaps (centering), the dissipation of heat in the area of highly stressed components (bearings) and the insertion of the rotor with its collector in the course of the automatic assembly sequence. During this latter operation, the carbon brushes are initially held in a retracted position, and after complete assembly of the motor the carbon brushes are then transferred from their waiting position to their operative position simply by introducing assembly pins at predetermined points.

The following description relates to one special embodiment of the invention which has shown to be particularly convenient, it being understood, however, that a plurality of modifications of certain details, in particular regarding the shape and arrangement of projections, or the like, are possible without leaving the scope of the present invention, and this especially in the area of the plastic carrier and mounting plates which are frequently used in embodiments of this type and which are provided with special extensions, projections, grooves, or the like.

Figure 1:
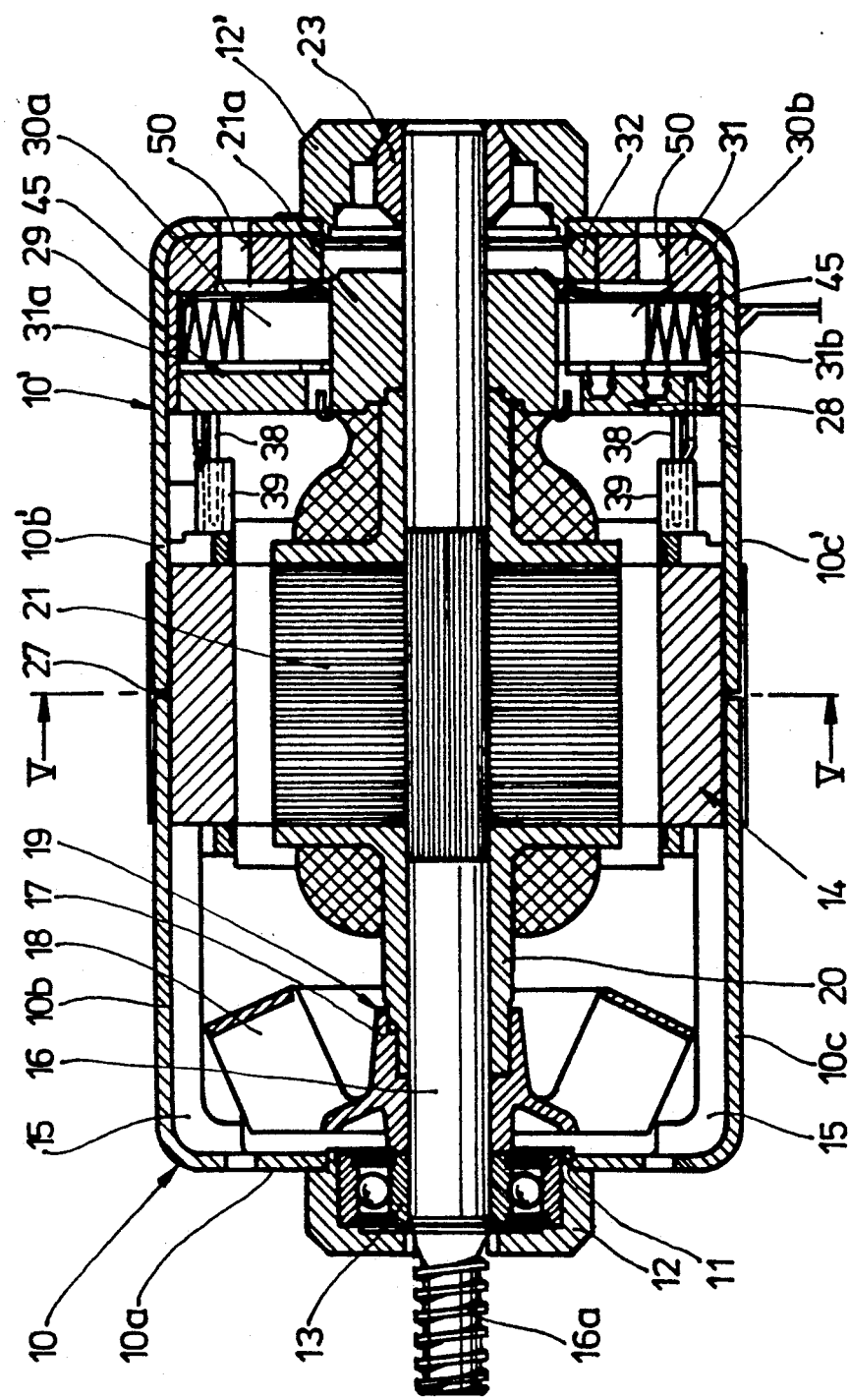
FIG. 1 shows a longitudinal section through the electric universal motor according to the invention in its finished state, ready for use, but without any enclosing housing.
Figure 2:
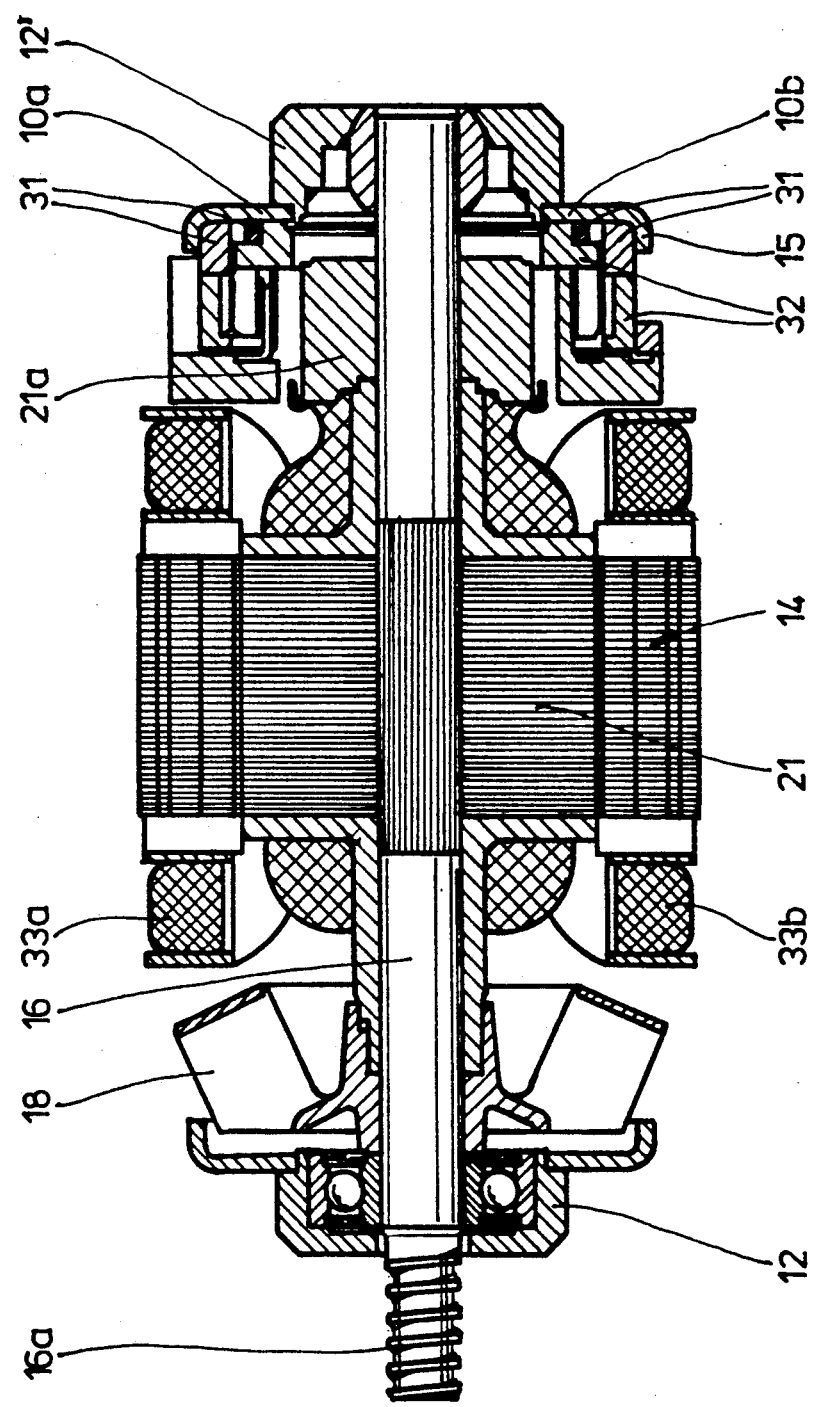
FIG. 2 shows another longitudinal section through the universal motor according to the invention, but rotated by an angle of 90°, relative to the representation of FIG. 1.
Figure 3:
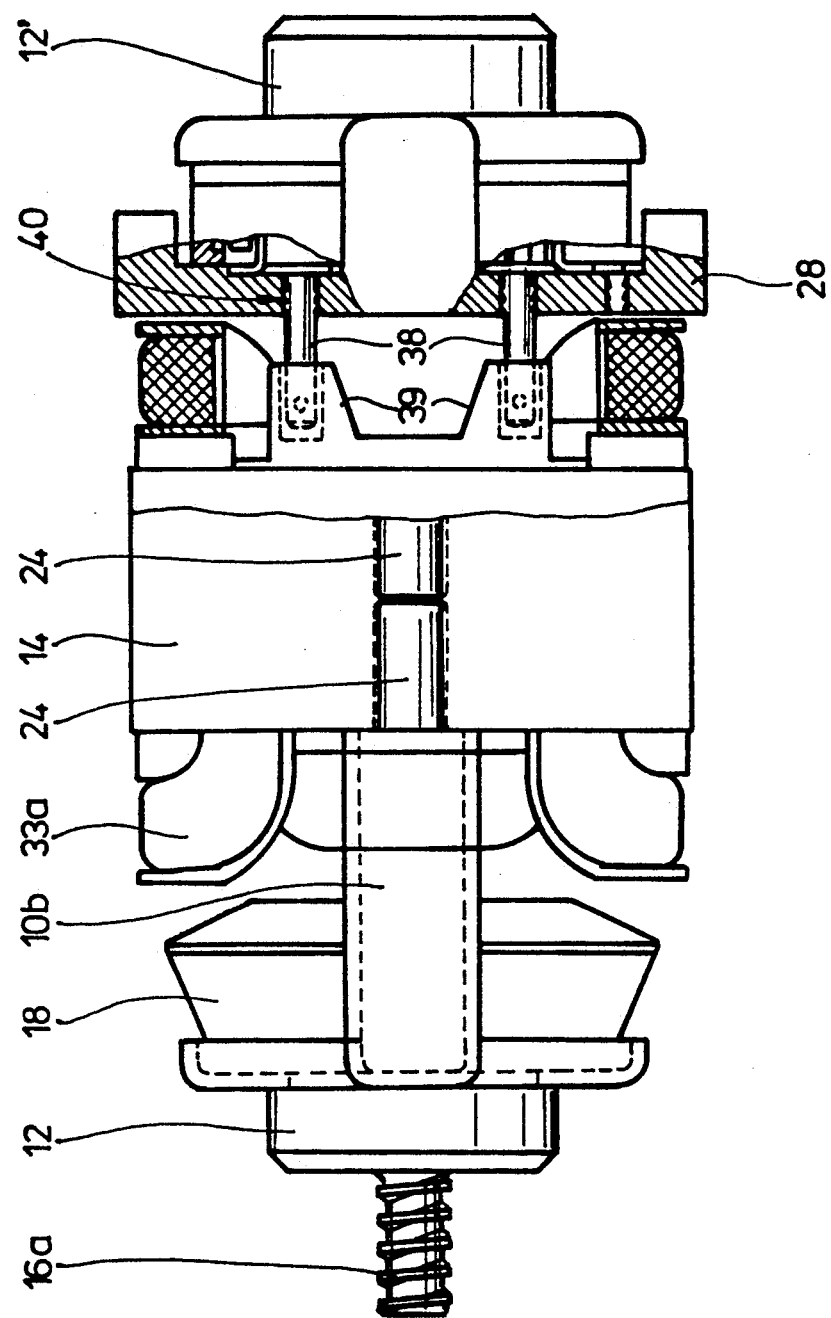
FIG. 3 shows a top view, with certain parts broken away, of the same universal motor which is illustrated in FIGS. 1 and 2.

Regarding FIGS. 1 to 3 from the left to the right, the basic structure of the electric universal motor, which is represented in these figures in the assembled condition, comprises, in the axial direction, first the end plate in the form of a first bearing bracket 10 accommodating, in a central bore 11 in its plate-shaped rear face 10a, a first pot-shaped bearing insert 12 which in turn secures the respective bearing, in the present case a roller or ball bearing 13 in a suitable manner, for example by a press fit. The bearing insert 12 is mounted flush in its receiving bore 11 and secured in place by wedging, clamping, beading, calking, notching or similar techniques, i.e. by operations which can be carried out fully-automatically and which ensure in any case that the desired centering and stability effects are safely obtained when the predetermined final dimensions are adhered too.

Figure 8:
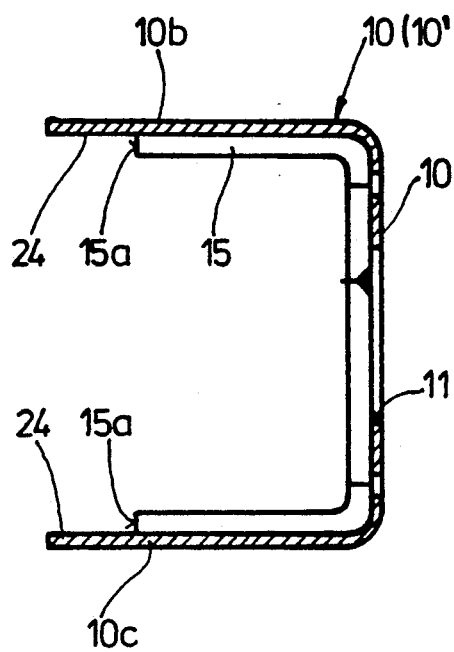
FIGS. 8 and 9 show a section and a front view, respectively, of one of the two outer bearing brackets of the universal motor.
Figure 9:
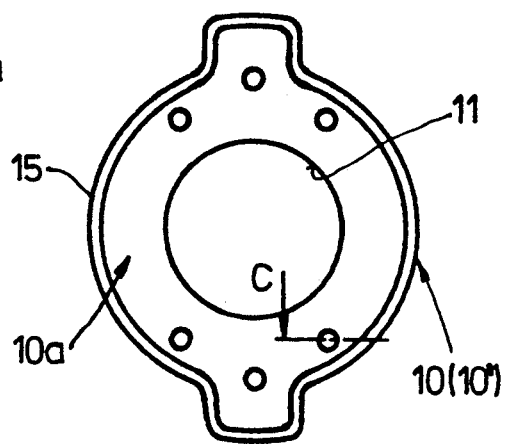

The shape of the bearing brackets 10 and of the— preferably—identical bearing brackets 10' provided on the other side as the end plate is that shown in detail in FIGS. 8 and 9. The plate-shaped rear face 10a is provided with projections 10b, 10c, projecting upwardly and downwardly in the representation of FIG. 1 and being bent off towards the central stator 14 so that an altogether bracket-shaped design is obtained for each bearing bracket 10, 10'. Preferably, each of the bearing brackets 10, 10' is made from a punched sheet of a corresponding thickness and provided with transverse ribs. The preferred embodiment illustrated in FIGS. 8 and 9 shows that the base plate 10a exhibits an all-round marginal reinforcement 15 extending also along the brackets 10b and 10c provided on both sides so that the latter also exhibit the cross-sectional shape of a U. Such a design ensures maximum stability values.

The bearing 13 accommodates the end of the rotor or armature shaft 16 which ends on this side in an outwardly projecting shaft end 16a which serves as power take-off shaft for the generated power and which may be provided with splines or similar means for mounting a pinion, for example.

Figure 5:
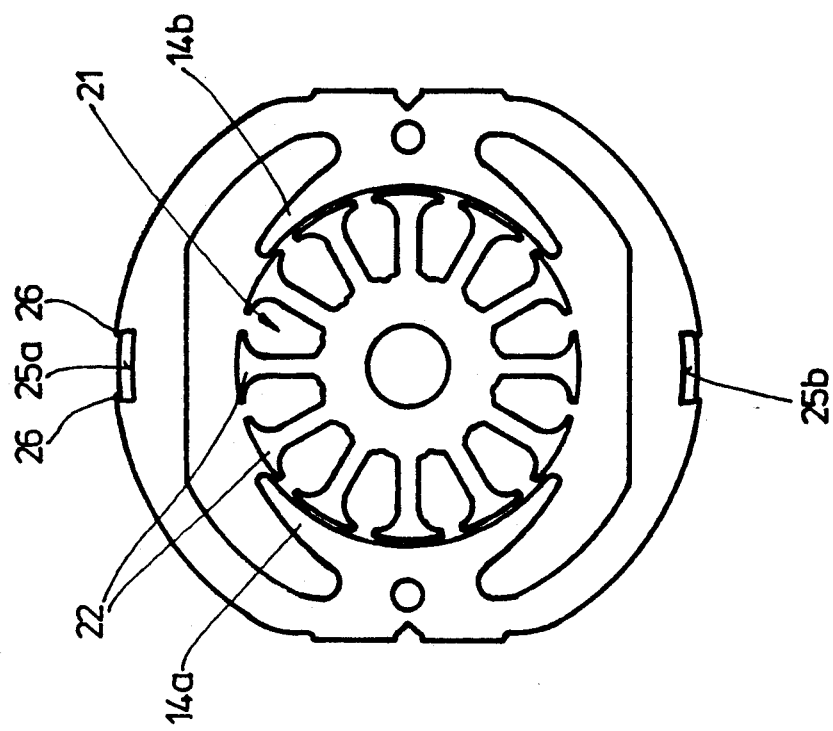
FIG. 5 shows a diagrammatic cross-section along line V—V in FIG. 1, with certain parts omitted.

Inside the housing, the bearing part 17 of the fan 18 is mounted on the armature shaft 16 to rotate therewith, the bearing part 17 being connected to rotate with the armature support and/or an armature support tube 20 via a toothed connection indicated at 19. The particular structure of the armature 21 need not be described in detail in this connection as it may be of any conventional form comprising—as indicated by the illustration of FIG. 5 showing the armature without winding—a predetermined number of pole shoes 22 coacting with stator pole shoes 14a, 14b arranged opposite each other in the form of predetermined arc segments.

The armature shaft 16 extends right to the opposite bearing bracket 10' whose central bore also accommodates a bearing insert 12' receiving a bearing 23 which in this case takes the form of a calotte bearing.

Given the fact that the bearing inserts have identical outer shapes, this arrangement provides the possibility to accommodate a bearing of any desired shape, depending on the user's preferences and the existing technical requirements, in the receiving bore 11 of the bearing bracket 10, 10', which always remains the same. The bearing insert 12' is likewise secured in place by beading, calking, notching, or the like.

One essential particular feature of the present invention should be mentioned immediately at this point. The U-shaped extensions or brackets 10b, 10c or 10b', 10c' of the two sturdy and robust bearing brackets 10, 10' engage directly a supporting groove provided in the stator plates 14. To say it in other words: the bearing brackets 10, 10' supporting the bearings 13, 23 for the armature shaft 16 on both sides are fixed in place directly on the part, i.e. the stator plates, without additional intermediate elements, intermediate carriers, housing means or the like, and the precise positioning of the bearings then necessarily leads to the formation of a uniform and small gap to the rotor carried on the shaft 16, or its pole shoes.

In order to permit highly precise and play-free positioning, the brackets 10b, 10c, 10b', 10c', which are directed, at the top and at the bottom, towards the stator and its receiving groove, are kept clear of the marginal edge 15 supplementing the U shape of the brackets in the area where they enter the groove, up to their point of contact, as indicated by the short extensions 24 in FIG. 8. Consequently, these extensions 24 can be introduced into the upper and lower stator grooves 25a, 25b until the stop 15a formed by the marginal edge 15 comes to rest against the stator plates whereby any further introduction is prevented. This feature also contributes decisively toward enabling the assembly to be carried out automatically since after introduction of the extensions 24 up to their abutment, they can be fixed in the grooves 25a, 25b by other suitable mechanical measures which can be carried out from the outside, for example by calking, beading, notching, or the like.

The receiving grooves 25a, 25b for the extensions 24 are directly worked into the material of the stator plates at the top and at the bottom, as illustrated by the representation of FIG. 5. The grooves may be covered on top, at least partly, by projecting marginal portions of the material 26 so that the extensions 24 received therein are held in place by all sides. The stator laminations are punched already in this shape with the grooves provided therein.

In order to permit the stops 15a of the bearing brackets to determine the depth of penetration of the extensions 24 into the stator plates, the extensions 24 of the two bearing brackets 10, 10' are slightly shorter than the overall thickness of the stator plates so that a gap 27, though a very small one, is left between them in the assembled condition. It will be readily appreciated that the stops 15a, apart from serving as an abutment, also provide an additional stabilizing effect since once this marginal edge has been introduced and calked or otherwise secured in place, it is additionally supported against torsion or tilting by the stator plates.

The next area to the right, as viewed in the drawing plane of FIGS. 1 to 3, is formed by the collector and the carbon brushes sliding on the collector. It will be easily seen that the individual components are provided in axially layered arrangement in this area. However, this arrangement is not achieved by integration or embedding, screw-connections, soldered connections or the like, but rather and only by mutual engagement in a form that can be produced also by an automatic machine, i.e. by simple positioning or stacking operations.

In detail, the rotor is followed by a carrier plate 28 and, following the latter, by a board-like grid 29 accommodating the electric wiring, which may also be described as a punched grid, grid shape, or grid pattern. Brush holders 30a, 30b are mounted opposite each other on the punched grid and, if desired, also on the carrier plate 28. The next component towards the right—as viewed in the drawing plane—consists of the mounting plate 31 provided with an inner bore accommodating a switching ring 32. The switching ring is provided with switching bows projecting towards the grid accommodating the electric wiring in order to effect the desired switching operations. The mounting plate 31 is further provided with projections 31a, 31b—two of these projections are shown in FIG. 1—projecting axially in the opposite direction right to the carrier plate 28 so as to secure and hold the latter in place by suitable overlapping engagement.

It is understood that the substantially two-dimensional elements of the axial main layers, i.e. the carrier plate, the grid shape 29 of the electric wiring, the mounting plate 31 and the plate-like switching ring 32 may have different configurations, depending on the sectional plane. This is due mainly to the manner in which the individual components engage each other by means of projections and openings and in which they perform their mutually supplementing functions. While the exact configurations of the individual elements are not of decisive importance for the invention, preferred embodiments thereof will be described in more detail with reference to the following figures. However, it should be kept in mind—as has been mentioned before—that the described embodiments constitute only certain special solutions which are not in any way meant to limit the invention.

The illustration of FIG. 2, which is turned by 90° relative to FIG. 1, shows clearly that the bearing brackets 10, 10' on both sides project from their respective base plates 10a and engage the stator only by narrow bracket-shaped extensions, which still ensures absolutely sufficient stability while opening up at the same time a wide range of possibilities for mounting the motor, including the possibility to enclose it additionally in a%housing consisting, for example, of a thin pot-like sheet-steel cylinder, or a plastic enclosure, or the like. These elements may, for example, be fastened on the bearing brackets or on the stator by means of screws. These arrangements need not be described in more detail in this connection because any such outer housings and their shapes may be selected to meet the particular application.

FIG. 2 shows at 33a, 33b the stator windings. In addition, it shows in more detail that in this rotated representation, where the arrangement of the brush holders does no longer interfere with the overlapping engagement, the switching ring 32 projects axially towards the punched grid, being supported in this area by the mounting plate. It can be further seen in the representation of FIG. 2 that the bent-off marginal edge 15 of the base plate 10a embraces the mounting plate 31, forming a cup-shaped recess accommodating and securing the mounting plate. In addition, the mounting plate is secured against rotation by knobs 34 arranged on the mounting plate and projecting to the rear, i.e. towards the bearing bracket 10' and engaging matching bores 35 (see FIGS. 14, 15 in conjunction with FIG. 4). The mounting plate 31 secured in place in this manner is thereby in a position to secure the other layered components 28, 29 and 32 in the collector area of the motor.

Figure 12:
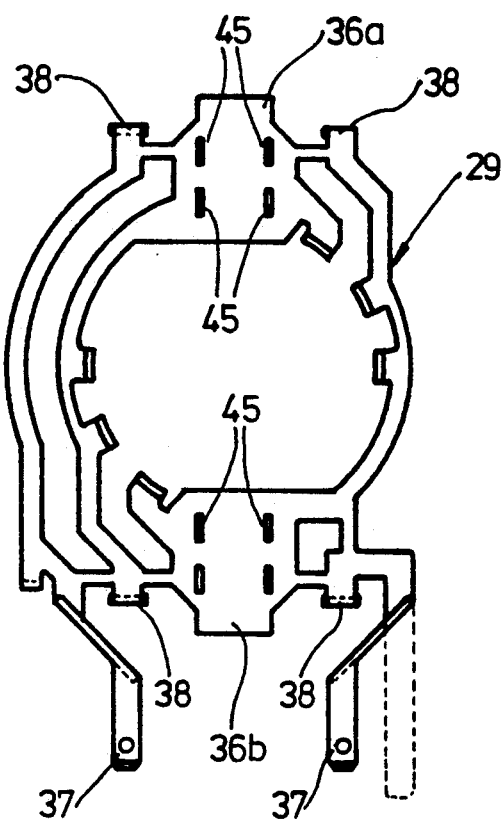
FIGS. 12 and 13 show a top view and a side view, respectively, of the grid pattern of the electric wiring, in the form of a punched grid.
Figure 13:
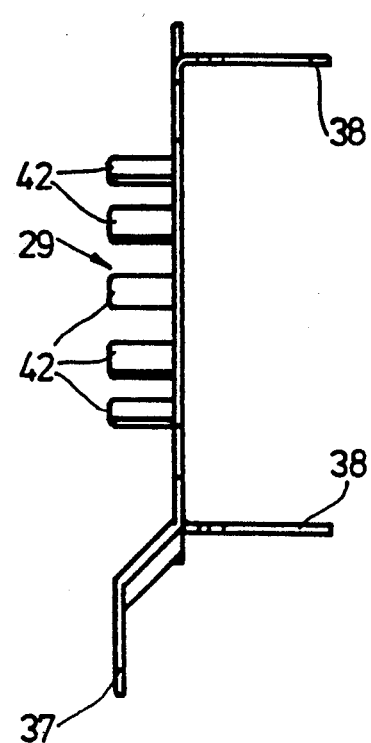

The grid shape 29 securing the electric wiring is illustrated in FIGS. 12 and 13. It appears from the drawing that the component in question consists of a flat punched grid forming electric lines in the form of metallic flat strips and larger areas with connection contacts and/or switching contacts formed by bent-off portions projecting from both sides of the plate-shaped grid.

Figure 18:
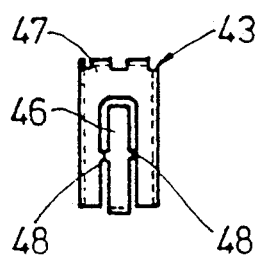
FIGS. 18 and 19 show a top view and a cross-sectional elevation, respectively, of one possible embodiment of a brush carrier to be fixed to the grid pattern of the electric wiring and to the carrier board arranged behind the latter.
Figure 19:
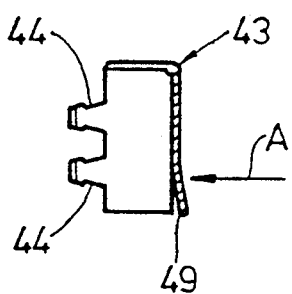

Regarding now FIGS. 12 and 13 in more detail, the grid shape 29 comprises two larger surface areas 36a, 36b of a size at least equal to the brush holders which are to be positioned thereon and which are shown in detail in FIGS. 18 and 19. The supporting surfaces 36a, 36b for the brush holders are connected, depending on the desired wiring, to stator connections and/or finally to the two outer connections 37, which are formed by flat portions of the grid which are bent off several times, via transverse webs and flat strips which are not designated in detail as their position can be selected at desire.

Figure 10:
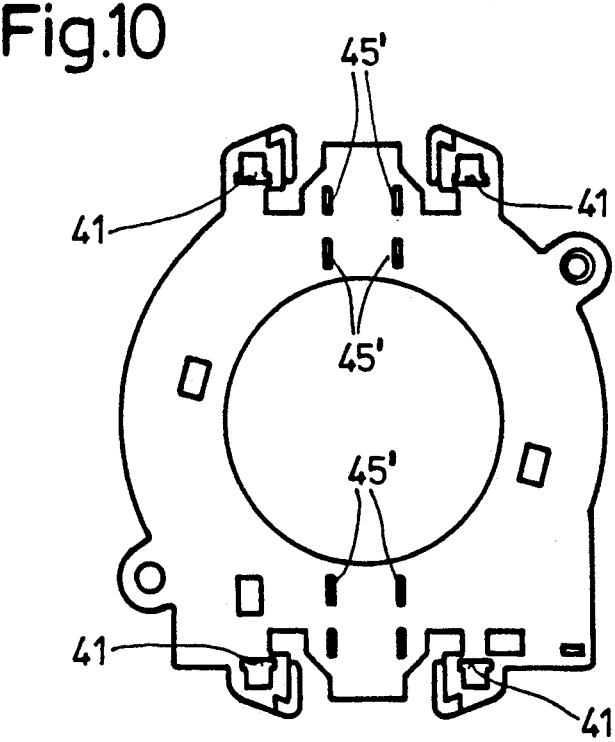

In the case of the illustrated embodiment, the grid shape 29 further comprises four first longitudinal contacts or terminals 38 which, according to the representation of FIG. 1 or 3, are passed through the carrier plate and introduced into associated receiving bushes 39 which project from the stator and are, accordingly, pre-formed from the plastic material forming part of the stator structure. These terminals 38, which are introduced into and secured in the bushes 39, provide an additional positioning and securing effect for the layered structure of the stator, in addition to the effect of the mounting plate. As can be seen best in FIG. 3, at 40, the contact reeds or terminals 38 are provided in the area of their passage through the carrier plate 28, which is provided in this area with pre-formed passage openings 41 (see FIG. 10), on both sides with toothings or outer hooks, in any case projections, by which they are anchored in the passage openings 41 of the carrier plate 28 firmly and undetachably. This is a first contribution towards securing the grid shape 29 firmly in place on the carrier plate 28, the grid shape 29 being otherwise mounted only loosely on the carrier plate 28, without being embedded or otherwise secured therein. The terminals 38 serve the function to establish the electric connections between the brushes and the stator windings 33a, 33b and/or the outer connections 37.

The grid shape 29 of the electric wiring is further provided with switching reeds 42 which are bent off towards the other side, related to the terminals 28, so that they project towards the switching ring 32. The switching reeds serve for effecting different switching operations with respect to the sense of rotation and the "on" and "off" condition of the motor, which will be explained further below in connection with the description of the switching ring.

Figure 11:
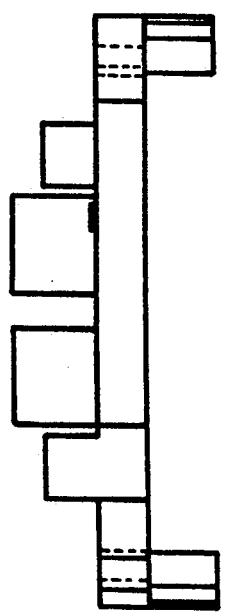

Another essential feature of the present invention is seen in the type, structure and mounting arrangement of the brush holders 43 illustrated in FIGS. 18 and 19. Each brush holder exhibits a box-like shape which is formed by bending off portions of a blank, except that the bottom of the box is missing as the latter is formed by the brush-holder supporting surfaces 36a, 36b of the grid shape 29. In addition, a (lower) side is missing, where the carbon brush, which is not shown in the drawing, projects from the brush holder. As can be seen best in FIG. 19, the two side walls are provided with locking pins 44 projecting downwardly beyond their edges. The pins 44 may have any desired shape, for example a slightly conical shape, and are preferably provided on both sides with locking teeth or hooks. These flat locking pins serve initially for positioning each brush holder on the associated brush-holder supporting surface 36a, 36b of the grid pattern 29 and for introducing it thereafter, for which purpose the locking pins 44 are passed through corresponding passage slots 45 in the respective surface. Given the fact that the grid pattern rests flat on the carrier plate illustrated in FIGS. 10 and 11, it is likewise provided with correspondingly aligned receiving slots 45' into which the locking pins of the brush holders 43 are introduced at a certain pressure and whose plastic material provides a safe anchoring effect. This arrangement serves the two following purposes: On the one hand, one obtains in this manner a particularly wide contact surface between the brush holders 43 and their supporting areas on the grid pattern, which surface then forms simultaneously one of the brush-holder walls so that the carbon brush contained in each brush holder is surrounded on all sides by an electrically conductive material (both the brush holder and the grid pattern consist, preferably, of a highly conductive brass alloy, or the like).

At the top, the carbon brushes are then supported resiliently by biassing springs (see FIG. 1) arranged in the brush holders 43. It is, therefore, not necessary to equip the biassing springs with separate spring holders, or the like, outside the brush holders.

The second advantage achieved by this arrangement consists in the fact than when the brush holders 43 are positioned on and anchored in the carrier plate 28, the grid pattern 29 arranged between the two parts is of course also pressed firmly against the carrier plate in this area and additionally connected therewith, it being of course also possible, if desired, to bend off additional flat toothed locking pins from the grid pattern itself and to use them as primary anchoring means between the grid pattern and the carrier plate.

Due to the clamped connection to the associated stationary receiving bushes 39 of the stator 14, the carrier plate 28, with the grid pattern 29 of the electric wiring mounted thereon, and the brush holders are already supported safely and undetachably.

Another advantageous characteristic of the brush holders 43 should also be mentioned in this connection.

Given the fact that it is impossible, in view of the preferred automatic assembly, to introduce the collector 21a into the area of the carbon brush, with the spring-loaded carbon brushes projecting from their brush holders 43, the brush holders are provided—as is already known in principle—with locking means which retain the carbon brushes in their retracted position until, after completion of the assembly operation, they can be released in order to bear resiliently against the collector, under the action of the spring.

In the embodiment illustrated in FIGS. 18 and 19, in conjunction with FIG. 1, one side wall of each brush holder 43, i.e. that side wall which after completion of the assembly operation faces the outer mounting plate, is provided with a rocker 46 formed by a punched portion of this side wall 47 in the form of a reed, which is connected to the side wall only by two narrow central transverse webs 48 arranged on both sides. In addition, the lower portion of the rocker 46, adjoining the passage opening for the carbon brush, exhibits one inwardly pointing hook 49. If, therefore, a force corresponding to arrow A in FIG. 19 is applied at first upon the rocker, after the biassing spring 45 and, thereafter, the carbon brush—not shown in the drawing—have been introduced into the brush holder 43 mounted on the grid pattern of the carrier plate, then the rocker will tilt and the hook 49 will engage behind the carbon brush, which tends to move outwardly, and retain it against the action of its biassing force.

In this condition, the following assembly operations can be carried out: Positioning the switching ring 32 in the mounting plate 31 and mounting the bearing bracket 10' of this side, or, if the bearing bracket 10' is assembled first, inserting the mounting plate 31 into the bearing bracket 10', then introducing the switching ring and mounting the pre-assembled subassembly comprising the carrier plate 28, the grid pattern 29 and the brush holders mounted thereon. Finally, this bearing bracket 10' is introduced into the guide grooves on the stator, as has been described before.

This completes already the assembly of the universal motor, except that the carbon brushes have to be pushed clear of their arrested position.

Figure 4:
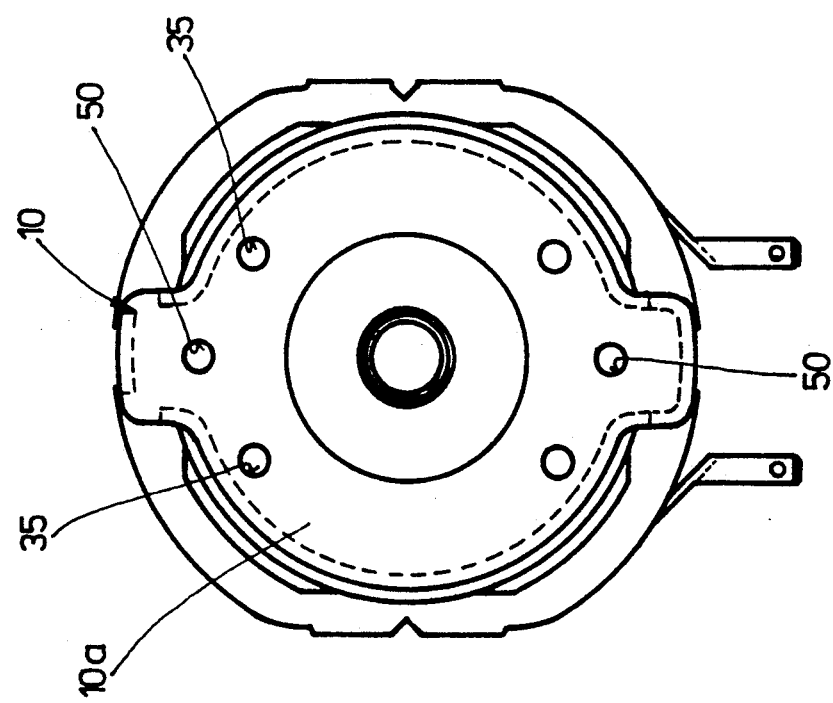
FIG. 4 shows a view from the right of the universal motor according to FIG. 1.
Figure 14:
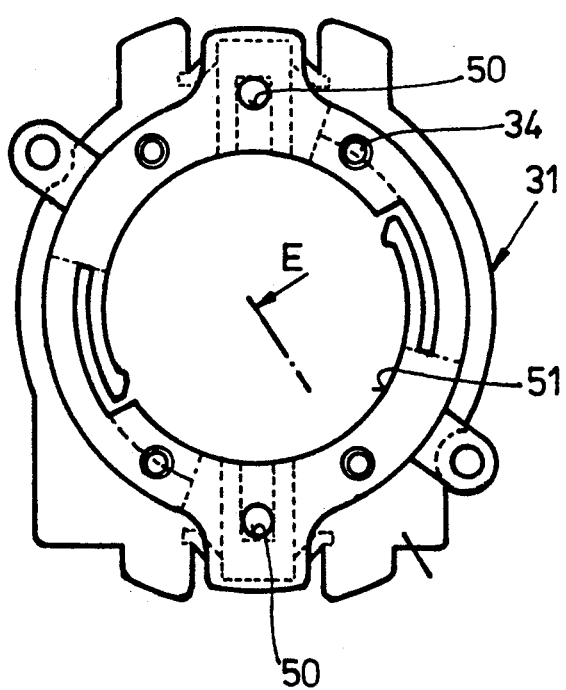
FIGS. 14 and 15 show a top view and a cross-sectional elevation of the mounting plate arranged on the side of the collector and adjoining directly the associated bearing bracket.
Figure 15:
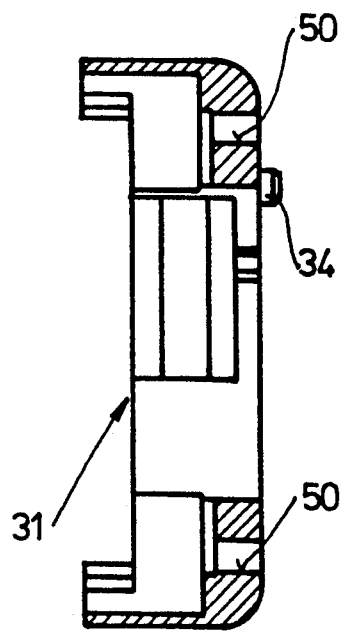

To this end, passage bores 50 are provided in the base plate 10a of the bearing bracket 10' and the mounting plate 31, as can be seen best in the representation of FIG. 1, in conjunction with FIGS. 4 and 14. The passage bores 50 are aligned in such a manner that two axial pins can be inserted into the bores 50 without any problems to exert pressure upon the upper portion of the rocker 46, whereby the rocker is moved into the position shown in the drawing, with its lower hooks 49 in their retracted position, and the carbon brushes are released.

Figure 16:
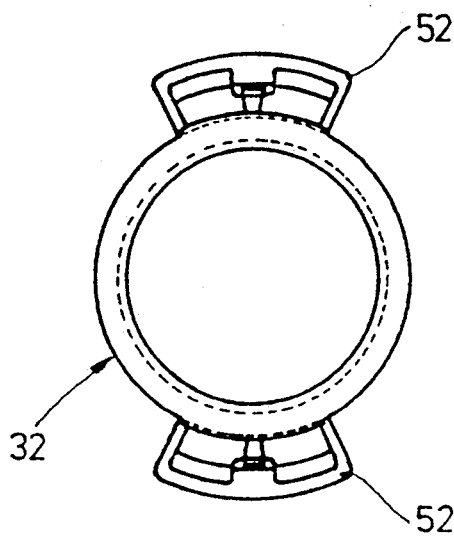
FIGS. 16 and 17 show a top view and a cross-sectional elevation, respectively, of one possible embodiment of a switching ring which engages the mounting plate and is seated therein, and which establishes contact connections in the area of the grid pattern of the electric wiring by means of switching bow carriers.
Figure 17:
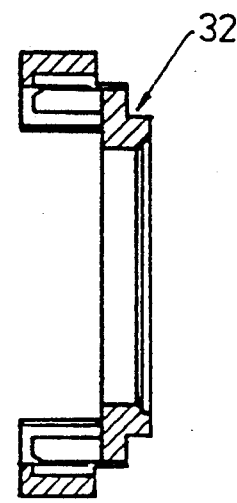

FIGS. 16 and 17 show the switching ring 32 in more detail. It appears from these figures that a shoulder of the ring 32 is inserted into the central receiving opening of the passage 51 in the mounting plate 31 in an angular position which ensures that oppositely arranged carriers 52 for the switching bows, which project radially outwardly and axially towards the grid pattern of the electric wiring, can in any case move freely about the desired angle of rotation necessary for effecting the switching operations.

Figure 7:
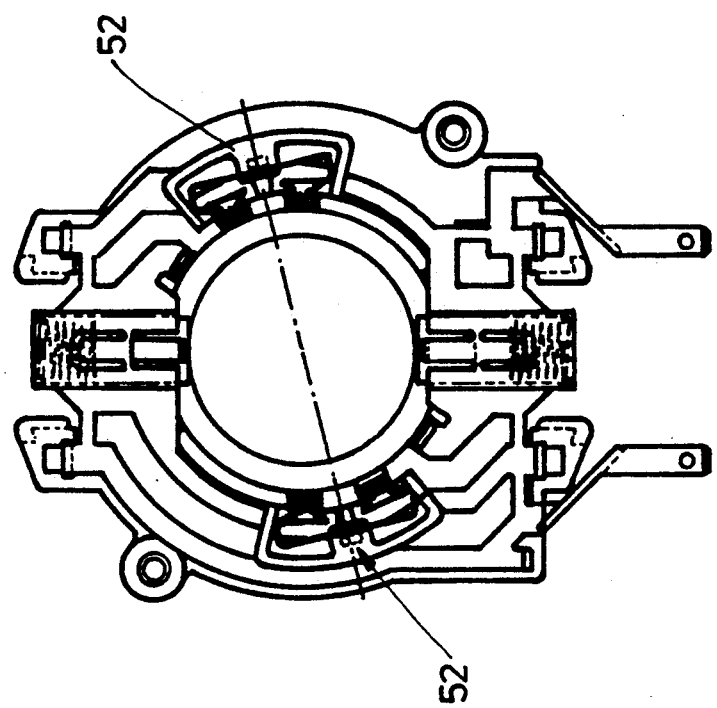
FIG. 7 shows the same representation as FIG. 6, but with the grid positioned and mounted on a carrier plate shown at the rear which, in the assembled condition, faces the rotor.
Figure 6:
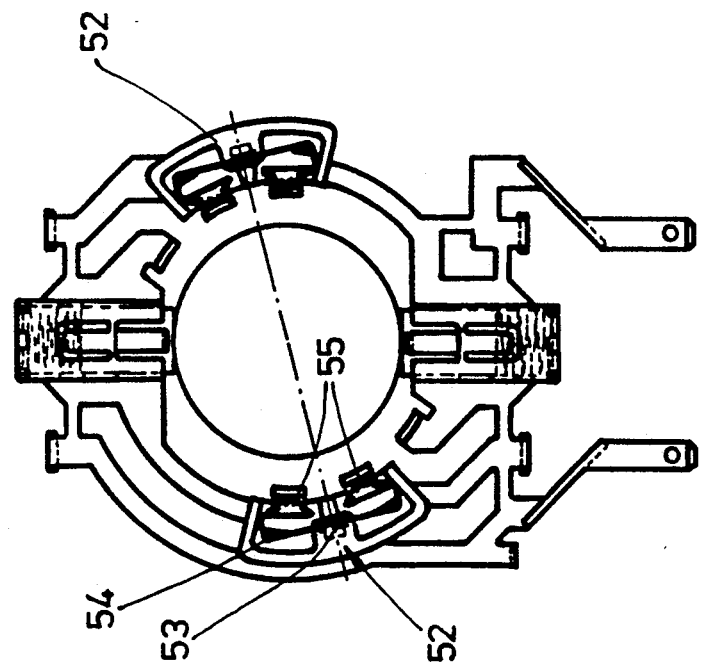

FIGS. 6 and 7 show that a central holding part 53 of the carriers 52 for the switching bows, which exhibits a symmetrical shape with hooks on both sides, receives or supports a switching contact spring 54 which is bent off similarly on both sides. For fixing the spring in place, a central portion of the spring 54 may be introduced under pressure into a receiving slot in the holding part 53 of the switching-bow carrier and then locked in position by means of suitable tooth-like projections.

The two hook-like contacts 55 of each switching contact spring, which are bent off once more inwardly, are arranged at such a distance relative to each other that they are always in contact with two of the switching reeds 42 projecting from the grid pattern 29 towards the switching ring and its switching-contact carriers, i.e. in the illustrated embodiment, from the outside, whereby they are interconnected electrically. Accordingly, in the case of the described embodiment, only two of the contact reeds 42 are interconnected at any time, although the invention is of course not limited to this embodiment, but may provide also for a greater or smaller number of contact reeds and a greater or smaller number of switching-contact springs for interconnecting the contact reeds or interrupting the current flow between them.

Figure 20:
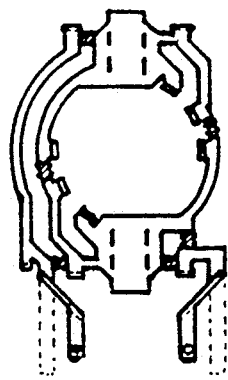
FIG. 20 finally shows, by its different punched-out patterns forming contact breaks, different wiring arrangements for determining and reversing the sense of rotation, and for switching the motor "on" and "off".
Figure 20:
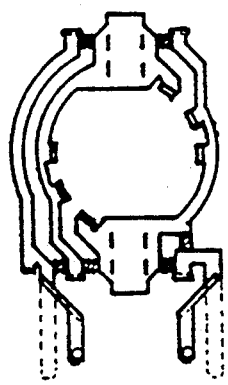
Figure 20:
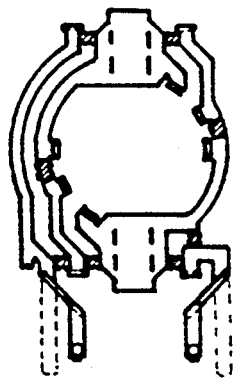

The variants illustrated in FIG. 20 show that in the case of the illustrated embodiment, specific senses of rotation may be selected or reversals of the sense of rotation may be effected by turning the switching ring and by punching out different bridges, as illustrated in the drawing by shaded areas. It goes without saying that on and off switching operations can be effected in the same manner.

In the case of the punched pattern of the grid illustrated in FIG. 20a), the predetermined direction of the current flow is obtained when the brush holders are connected to the four connection bushings of the stator windings according to the sequence of the wiring diagram, via their associated brush-holder supporting surfaces; FIG. 20b) shows the opposite arrangement so that one obtains two different senses of rotation, one in clockwise and one in counterclockwise direction, while the punched pattern illustrated in FIG. 20c) permits to select alternate senses of rotation, depending on the switching maneouvers effected on the switching ring, i.e. on which reeds are interconnected. The senses of rotation are indicated in the drawing by R for clockwise rotation and L for counter-clockwise rotation.

FIGS. 6 and 7 show the grid pattern of the electric wiring with the brush holders mounted thereon and the switching-bow carriers arriving from the switching ring (FIG. 6), while FIG. 7 shows this structure in its entirety, positioned on the carrier plate and mounted to the latter by means of the locking pins.

All features described by the specification and the following claims may be essential to the invention either individually or in any combination thereof.

We claim:

1. An electric universal motor for driving hand tools, garden tools, and office machines having a stator including stator plates, stator terminals and a stator winding, a rotary armature having a collector, brushes and brush holders, a shaft carrying the armature, the improvement comprising:

end plates provided on both sides of the armature for supporting the shaft, the end plates being in the form of brackets having extensions directly connected with said stator, each end plate being provided with a central bore for receiving bearings for rotatively supporting the armature shaft, a first supporting plate (28), adjacent to the armature, a circuit board supported by the supporting plate, a mounting plate (31) rotatably mounting a switching ring, having switching contact springs carried thereon, the supporting plate, circuit board and mounting plate disposed in an axially layered arrangement, the circuit board having the form of a punched grid made of electrically conductive material and forming flat strip-like lines which are interconnected by punchable bridges, said grid having first contact means (38) extending through said supporting plate (28) and being directly connected with stator terminals, contact strips (42) provided on said punched grid extending in a direction opposite to the first contact means and arranged such that the switching contact springs carried with said switching ring (32) are enabled to make electrical connections with respective contact strips (42) depending on the position of said switching ring (32), said punched grid simultaneously carrying said brush holders which are electrically connected thereto.

2. Electric universal motor according to claim 1, wherein next to said mounting plate (31) there is provided said switching ring with switching-bow carriers (52) and switching contact springs (54) mounted thereon, which extend to said contact strips of said grid (29) of said circuit board forming the electric wiring, which said extensions serve to effect on and off switching, or reversing operations depending on which contacts are made.

3. Electric universal motor according to claim 2, wherein said mounting plate (31) on the side of the bearing bracket, which accommodates said switching ring in a central bore so as to enable the ring to be rotated, comprises axial projections (31a) which engage behind said carrier plate (28) to seize the latter and secure it in place, and that said mounting plate (31) itself is connected to the neighboring bearing bracket (10') by means of suitable anchoring means.

4. Electric universal motor according to claim 3, wherein said anchoring means for said mounting plate (31) consist of knob-like projections (34) projecting from said mounting plate (31) and engaging correspondingly aligned, matching receiving bores in the bottom (10a) of said bearing bracket.

5. Electric universal motor according to claim 1, wherein said bearing brackets (10,10') arranged on both sides and forming two end plates comprise at their end a base plate (10a) and brackets (10b, 10c; 10b', 10c') extending from opposite points of the latter and provided with end portions (24) engaging directly in receiving grooves (25a, 25b) worked into the stator plates.

6. Electric universal motor according to claim 5, wherein said brackets 10b, 10c' 10b', 10c') including said base plate (10a) are provided with an all-round raised marginal edge (15) and have the cross-sectional shape of a U, and that said marginal edge, which is omitted on said extensions (24) of said brackets which are introduced into the receiving grooves (25a), 25b) in said stator, form a stop (15a, 15b) which comes to rest against the outside of said stator plates, thus limiting the length of introduction.

7. Electric universal motor according to claim 5, wherein said receiving grooves (25a, 25b) in said stator (14) exhibit an at least partially closed shape.

8. Electric universal motor according to claim 7, wherein said receiving grooves (25a, 25b) overlap and cover the upper marginal areas of said extensions (24) of the brackets in their introduced position, by extensions (26).

9. Electric universal motor according to claim 1, wherein said bearing inserts (12, 12') comprise annular shoulders and are inserted, by an annular projection, into the centering bores (11) of said bearing brackets (10, 10') provided on both sides, and retained therein by wedging, calking, notching, beading, and that they accommodate in their interior bearings for said rotor shaft (16).

10. Electric universal motor according to claim 1, wherein said circuit board takes the form of said punched grid (29) designed as a flat punched disk made of an electrically conductive material and including flat strip-like lines which are interconnected by punchable bridges, with at least two, preferably four, longer terminals (38) projecting from such lines towards the stator said terminals being passed through the adjoining carrier plate (28) and introduced into receiving bushes (39) fixed to the stator and forming an integral part thereof.

11. Electric universal motor according to claim 10, wherein said terminals (38), which are reed like and guided in the axial direction to the receiving bushes (39) of the stator (14), comprise a metallic material and comprise, in the area where they pass through said carrier plate, (28) comprising a plastic material, laterally projecting teeth, hooks, or locking lugs, by which they engage said carrier plate (28) firmly securing in this way simultaneously the grid (29).

12. Electric universal motor according to claim 10, wherein in addition to said terminals (38) extending from the grid (29) and establishing contact with said stator plates, switching reeds (42) project in the opposite axial direction and are bridge by suitably assigned switching contact springs (54) seated on switching-bow carriers (52) of said switching ring (32).

13. Electric universal motor according to claim 12, wherein depending on the different contacts established between said switching reeds (42) by rotation of said switching ring (32), different senses of rotation and on or off switching operations can be selected, depending on the pattern of connection bridges punched out from said strip conductor material of said punched grid (29).

14. Electric universal motor according to claim 1, wherein the grid (29) forms, at the point where said brush holders (43) are to be mounted, brush-holder supporting surfaces (36a, 36b) having a size at least equal to that of the said brush holders (43) and forming a contact surface for the brush holders (43), the brush-holder supporting surfaces (36a, 36b) forming a missing wall of box-shaped brush holders (43) which are open at the side facing the collector.

15. Electric universal motor according to claim 14, wherein said brush holders are provided with locking pins (44) projecting towards said grid (29) on which the holders are mounted, which pins are passed through slots (25) in said grid (29) and subsequent slots (45') in said carrier plate (28) and secured in place in the latter by means of lateral saw-tooth shapes, projecting hooks, locking lugs, or the like, thus providing an additional anchoring effect for said grid (29) on said carrier plate and ensuring safe anchoring and a large-surface contact between said brush holder (43) and said grid (29).

16. Electric universal motor according to claim 14, wherein said brushes are biassed towards said collector by means of spirally wound compression springs (45) arranged inside said brush holders (43).

17. Electrical universal motor according to claim 1, wherein a rocker-like locking bar (46) is formed in an area of each said brush holder (43) which is accessible from the outside through bores in said bearing bracket (10') and said mounting plate (31), by exerting axial pressure, which locking bar (46) is adapted to secure said brushes, which are spring loaded in said brush holder (34), so that they will not be released before completion of the final assembly operation.

18. Electric universal motor according to claim 17, wherein the locking bar in the form of a rocker (46) is formed from the material of said brush holder (43), and is supported for partial rotary movement approximately at its center by material webs (48) extending from both sides to the remaining wall of each brush holder (43) so that an end hook (49) of said rocker (46) engages or releases said carbon brush depending on the point where pressure is exerted upon said rocker from the outside, above or below the pivot point.

* * * * *